Jan. 9, 1968   D. HEYER   3,362,241
VARIABLE SPEED DRIVE AND ADJUSTOR MEANS THEREFOR
Filed March 29, 1965   8 Sheets-Sheet 1

INVENTOR
DON HEYER
By Paul A. Weilein
ATTORNEY

Jan. 9, 1968 D. HEYER 3,362,241
VARIABLE SPEED DRIVE AND ADJUSTOR MEANS THEREFOR
Filed March 29, 1965 8 Sheets-Sheet 2

PULLEY HUB    THRUST INSERT

INVENTOR
DON HEYER
By Paul A. Weilein
ATTORNEY

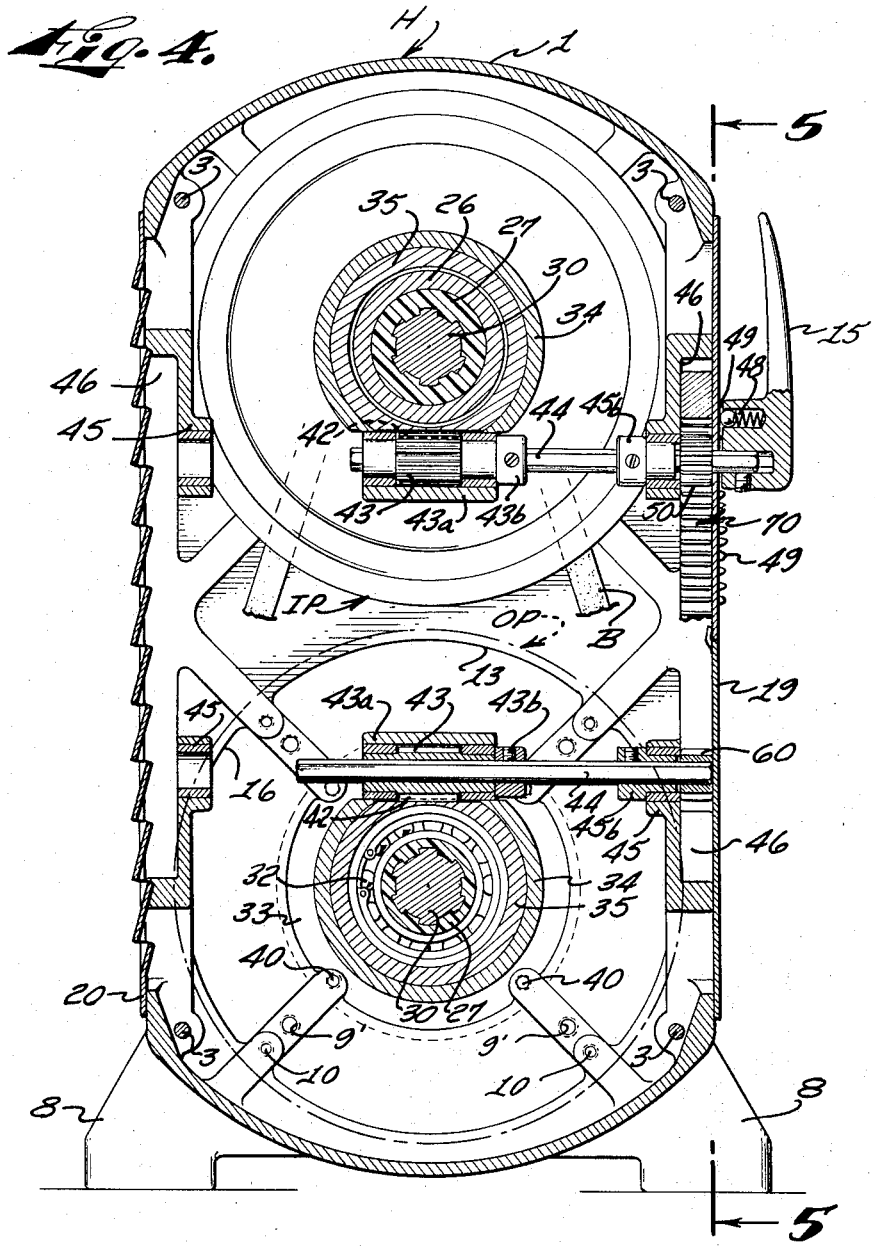

Jan. 9, 1968     D. HEYER     3,362,241
VARIABLE SPEED DRIVE AND ADJUSTOR MEANS THEREFOR
Filed March 29, 1965     8 Sheets-Sheet 4
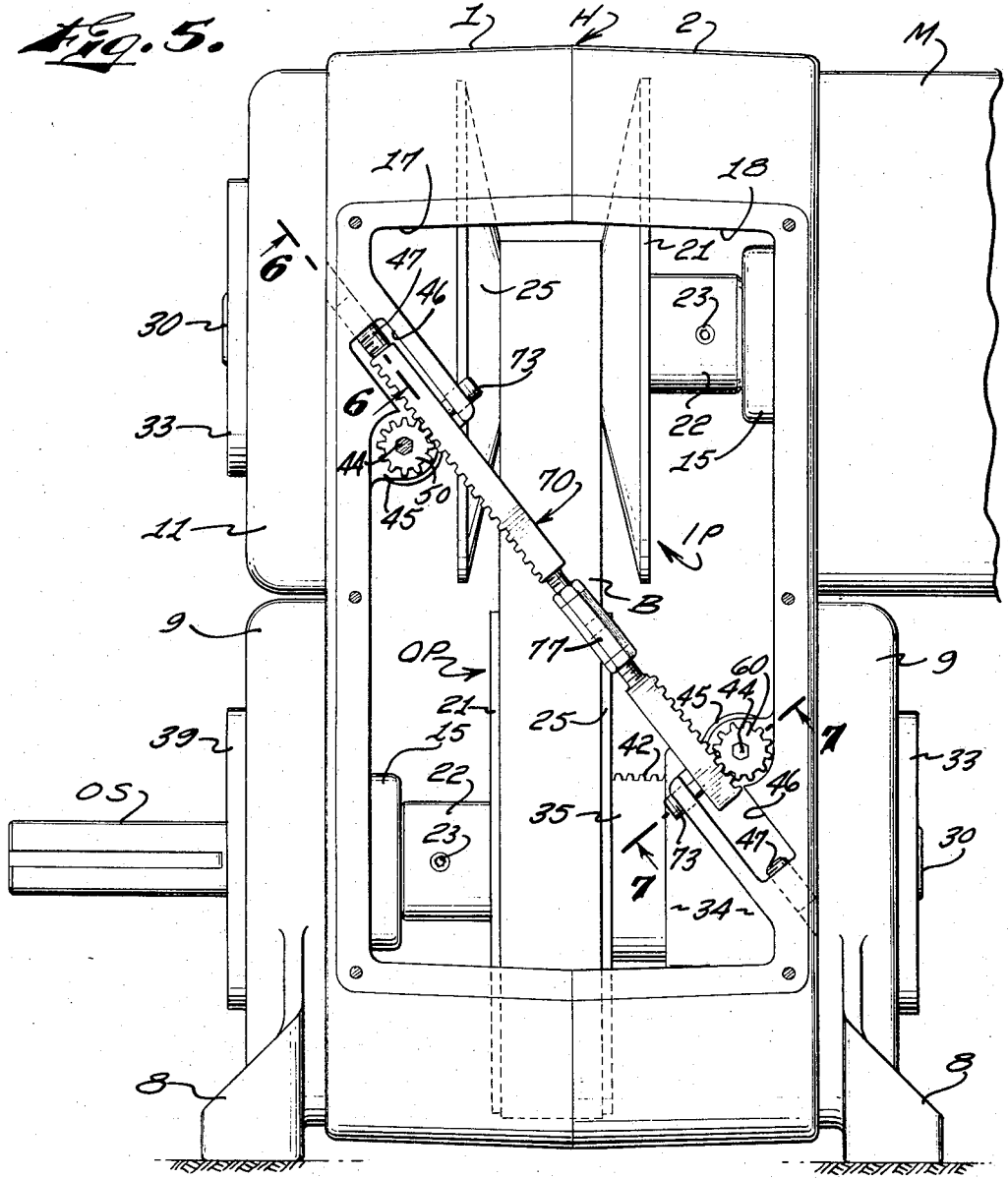
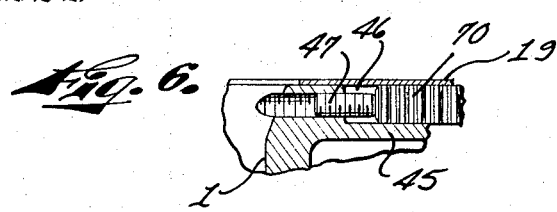
INVENTOR
DON HEYER
By Paul A. Weilein
ATTORNEY Jan. 9, 1968             D. HEYER             3,362,241
VARIABLE SPEED DRIVE AND ADJUSTOR MEANS THEREFOR
Filed March 29, 1965             8 Sheets-Sheet 5
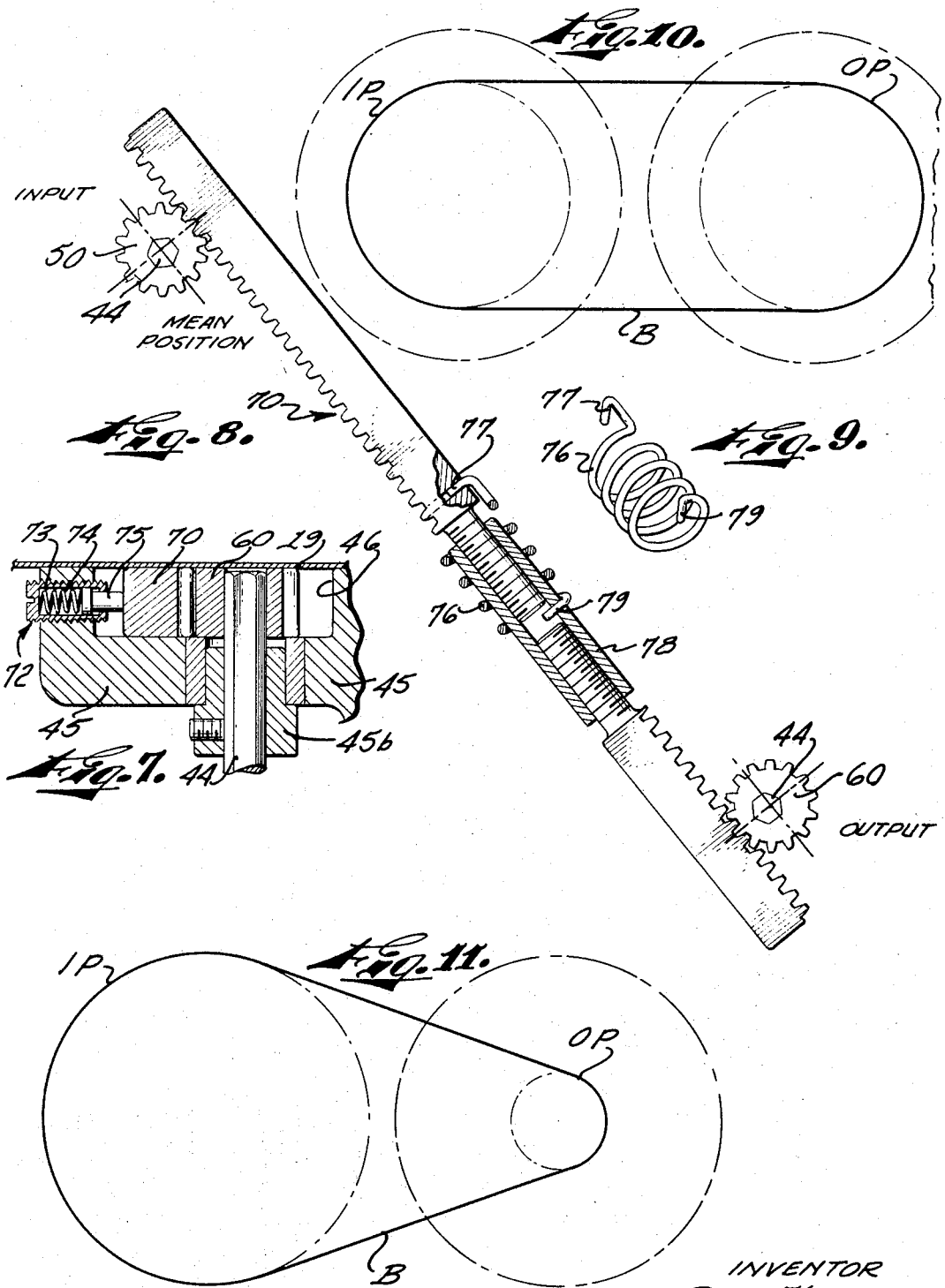
INVENTOR
DON HEYER
By Paul A. Weilein
ATTORNEY

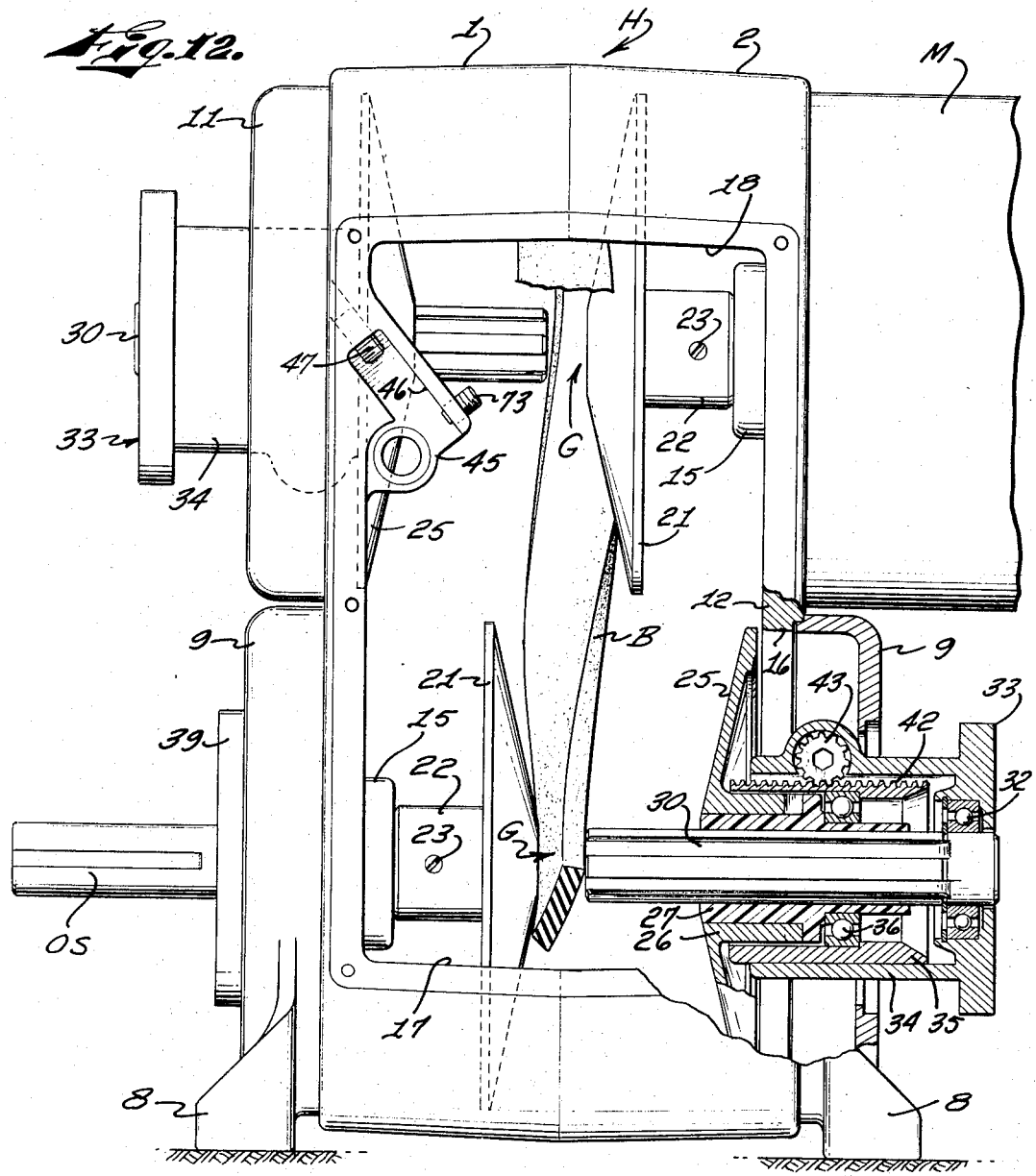

Jan. 9, 1968 D. HEYER 3,362,241
VARIABLE SPEED DRIVE AND ADJUSTOR MEANS THEREFOR
Filed March 29, 1965 8 Sheets-Sheet 7
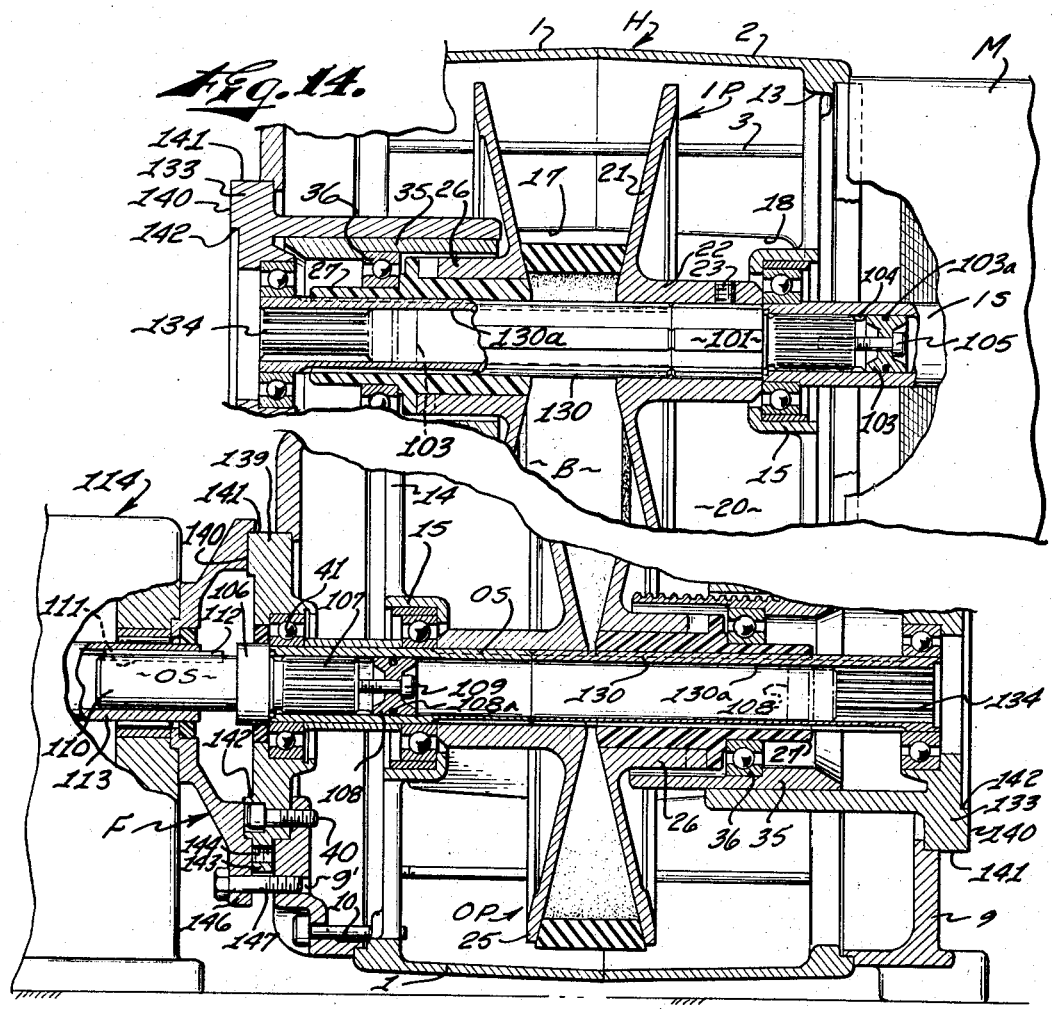
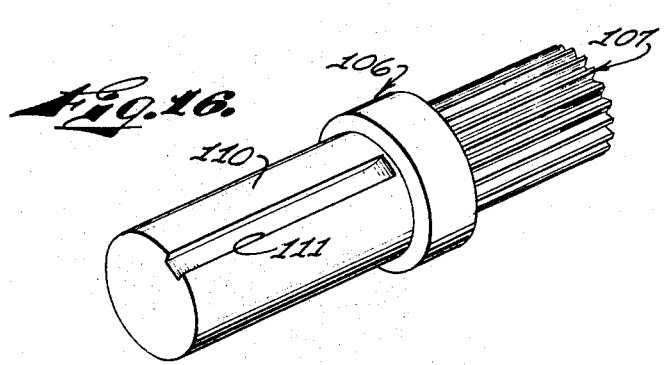
INVENTOR
DON HEYER
By Paul A. Weilein
ATTORNEY Jan. 9, 1968   D. HEYER   3,362,241
VARIABLE SPEED DRIVE AND ADJUSTOR MEANS THEREFOR
Filed March 29, 1965   8 Sheets-Sheet 8

Fig. 17.

INVENTOR
DON HEYER
By Paul A. Weilein
ATTORNEY

United States Patent Office 3,362,241
Patented Jan. 9, 1968

3,362,241
VARIABLE SPEED DRIVE AND ADJUSTOR
MEANS THEREFOR
Don Heyer, 1019 N. Raymond Ave.,
Fullerton, Calif. 92631
Filed Mar. 29, 1965, Ser. No. 443,593
49 Claims. (Cl. 74—230.17)

The present invention relates to a variable speed pulley belt drive, and more particularly to improvements in the class of variable speed transmission devices wherein a housing contains a drive pulley and a driven pulley, each pulley having one disc axially adjustable relative to the other to effect engagement with a belt extending between the pulleys at different effective belt engaging pulley diameters whereby the speed of the output or driven pulley shaft is varied.

Typically, variable speed pulley belt drive mechanisms have heretofore been constructed so that the adjustment of the effective pulley diameter contacted by the belt is made without regard to the fact that at different drive ratios above and below a mean drive ratio, or a ratio of 1:1, the lineal dimension or length of the path of belt travel varies. Such variation in the length of the belt path about the pulleys has, in such devices, caused adverse belt wear or deterioration inasmuch as the belt has been required to flex or yield transversely.

Alternatively, it has been the practice in certain of the typical devices that the output pulley may be spring loaded so as to automatically adjust responsive to adjustment of the input pulley by some positive adjusting mechanism. The consequence of such spring-loaded, self-adjusting pulleys is that the spring must be strong enough to assure adequate frictional coengagement between the belt and the pulleys through the entire range of changeable speeds. Such springs, however, inherently have created a condition which is undesirable in the sense that the lower the ratio of input to output speeds, the greater is the space between the adjustable output pulley sections and the greater is the compression of the pulley loading spring at the high speed, low torque ratios, when as a matter of fact, at high speed, low torque adjustments it is preferable in some applications that the lateral pressure applied to the belts be minimized.

The present invention addresses itself primarily to the provision of a mechanism whereby the input and output pulleys may be simultaneously positively adjusted to effect adjustment of the input to output ratio, thereby eliminating the need for a loading spring, but at the same time effecting a differential pulley adjustment which may take into consideration the constantly varying difference in pulley path length at different ratios at either side of the mean or 1:1 ratio, but if desired, the adjustment may be such as to purposely increase friction pressure on the belt at high speed or low speed.

An object of the invention is to provide a pulley adjustor mechanism that has a wide range of flexibility in that various adjustments may be provided for to suit the specific requirements of the particular use to which the pulley belt drive is to be put.

It is a further object of the invention to provide in such a change speed pulley belt drive pulley, mountings which facilitate the changing of belts as is inherently required from time to time in all of the devices of the class here involved.

Yet another object is to provide a mechanism as referred to above in which access to the adjustor mechanism and to the pulley assemblies for purposes of changing belts is easily accomplished and wherein the adjustable pulley elements of each pulley assembly are so mounted as to be simply removed for service or repair as a unit without requiring substantial disassembly of the device.

In accomplishing objectives of the invention insofar as they relate to the simultaneous but differential adjustment of the pulley mechanisms, it is another and more specific object of the invention to provide means which in one embodiment includes a rack and pinion mechanism operable to simultaneously adjust the respective pulleys wherein the pinion which effects adjustment of one of the pulleys is so constructed that it will cause a progressively varying movement of the adjustable pulley section at either side of a mean position. Illustratively, the invention contemplates employing a pinion engageable with the rack in such a manner as to provide a pitch diameter which progressively varies, i.e., the pinion is mounted in eccentric relation upon its shaft.

In a more specific sense, the invention contemplates the provision of a rack operable on pinions which effect pulley adjustment, such pinions being selectively eccentrically positionable relative to the shaft so that a wide range of selective variable adjustments may be attained.

In accomplishing the objectives of the invention insofar as they relate to the maintenance of a predetermined belt tension at different input to output ratio adjustments, it is another and more specific object of the invention to provide means which in one embodiment of the invention includes a pair of pulley adjustor motor mechanisms which are energized in such a manner as to maintain the input and output pulley assemblies in selected adjustments and which motors may be selectively energized so that one overcomes the other to effect a change in selected input to output pulley ratio adjustment.

It is a further object of the invention to provide in such a motor adjusted change speed pulley belt drive assembly, means whereby the motor torque applied to the adjustable pulley sections to hold the same in a selected adjusted drive ratio may be varied to vary the net belt tension. Such variation of the motor torque may be, within the purview of the invention, predetermined so that at different drive ratios different belt tensions are encountered and so that within the range of operative adjustment of the apparatus the belt tension and therefore the friction pressure applied to the belt may be high under high torque or low torque output conditions, as referred to above. More specifically, the invention contemplates eccentric means operable upon adjustment of at least one of the pulley assemblies to effect a variation in the energizing voltage going to the respective adjustor motors responsive to the relative position of adjustment of said one of the pulley assemblies.

Other objects and advantages of the invention will be hereinafter described or will become apparent to those skilled in the art, and the novel features of the invention will be defined in the appended claims.

In the accompanying drawings:

FIG. 1a is a view in perspective illustrating a variation of the device of FIG. 1, with a work device applied to the output shaft;

FIG. 4 is a vertical sectional view as taken on the line 4—4 of FIG. 2;

FIG. 5 is a view taken on the line 5—5 of FIG. 4 with the closure plate removed;

FIG. 6 is a fragmentary sectional view as taken on the line 6—6 of FIG. 5;

FIG. 7 is a fragmentary sectional view as taken on the line 7—7 of FIG. 5;

FIG. 8 is a diagrammatic view illustrating the rack and pinion adjustor means in a position of mean pulley adjustment;

FIG. 9 is a detail view in perspective illustrating the spring element included in the rack mechanism of FIG. 8;

FIG. 10 is a view diagrammatically illustrating the pulleys and the belt in a condition of mean adjustment;

FIG. 11 is a view diagrammatically illustrating the pulleys and the belt in a condition of high speed adjustment;

FIG. 12 is a view taken at the opposite side of the device from FIG. 5 and with the closure removed, certain of the parts being broken away and shown in section and illustrating the mode of belt change;

FIG. 13 is a view in perspective illustrating a variation in the adjustable pulley belt drive and including control means in accordance with another embodiment of the invention and with a work device applied to the output shaft;

FIG. 14 is an enlarged fragmentary view partly in section and partly in elevation as taken substantially on the line 14—14 of FIG. 13;

FIG. 15 is a view partly in elevation and partly in section as taken substantially on the line 15—15 of FIG. 13;

FIG. 16 is a view in perspective illustrating a typical adapter shaft for use with the structure of FIG. 15; and FIG. 17 is a view diagrammatically illustrating the control mechanism for varying the drive ratio while maintaining a predetermined belt tension in accordance with the embodiment of the invention as shown in FIG. 13.

Like reference characters in the several views of the drawings and in the following description designate corresponding parts.

Figure 1:
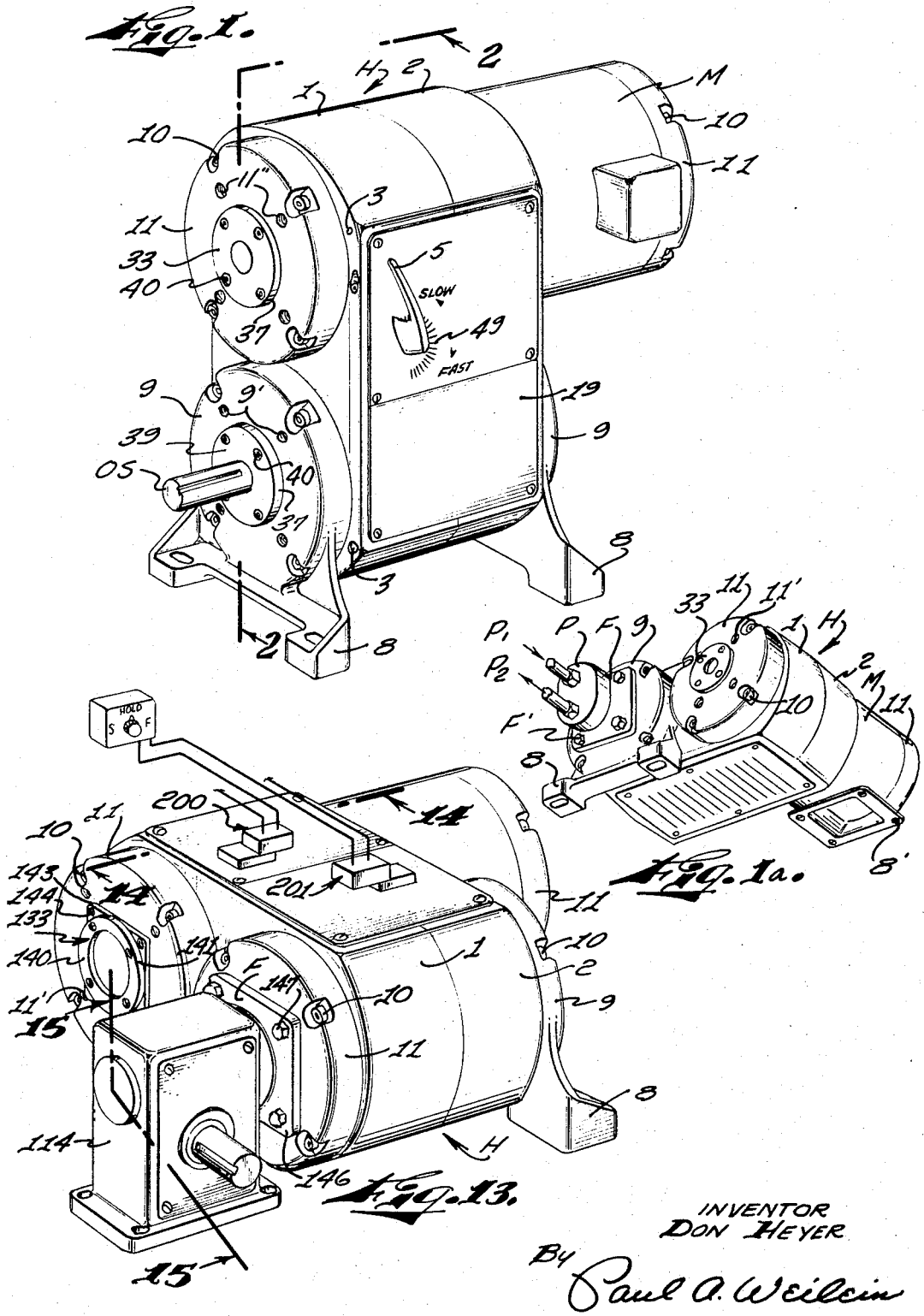
FIG. 1 is a view in perspective illustrating a variable pulley belt drive incorporating the features of the present invention in accordance with one embodiment.

Referring to FIG. 1, the present invention is shown as being embodied in an assemblage comprising a housing H formed of a pair of half parts 1 and 2 secured together by through bolts 3 and having mounted on one side thereof a motor M which will transmit power through a variable pulley belt drive, to be hereinafter described, to an output shaft which, in the illustrated embodiment, is designated OS and extends from the housing H through the opposite side thereof from the motor M and in laterally spaced relation to the motor axis so that the assembly may be characterized as a Z drive. The drive ratio between the motor M and the output shaft OS may be varied by effecting adjustment through adjustor means operable by a control handle 5, and an indication of the selected ratio may be viewed visually at graduated markings 5′.

The housing H may be supported upon legs 8 formed as a part of housing closure plates 9 which may be suitably secured as by fasteners 10 in selected orientations relative to the housing H so that the latter may obviously assume a wide variety of positions, only one of which is illustrated in FIG. 1. It will be appreciated that a wide range of selected positions is available by transposition of the just-mentioned closure plates 9 with closure plates 11 which are similar to the plates 9 with the exception that the plates 11 are not provided with legs as are the plates 9.

In FIG. 1a there is illustrated another selected disposition of the housing H wherein the closures 9 and 11 are so oriented that the housing H is adapted to assume a position with the motor axis and the output shaft OS disposed in horizontally spaced relation, whereas in FIG. 1 the motor axis and output shaft are disposed in vertically spaced relation. Moreover, it will be noted in FIG. 1a that the motor housing is provided with a base 8′ which will afford support for the motor in diagonally spaced relation to the legs 8 on the closure plate 9 at the output side of the assembly. In FIG. 1a there is shown mounted on the housing closure 9 and, therefore, in driving relation with the output shaft, a form of work device which illustratively is depicted as a pump P having an inlet P1 and an outlet P2.

Figure 2:
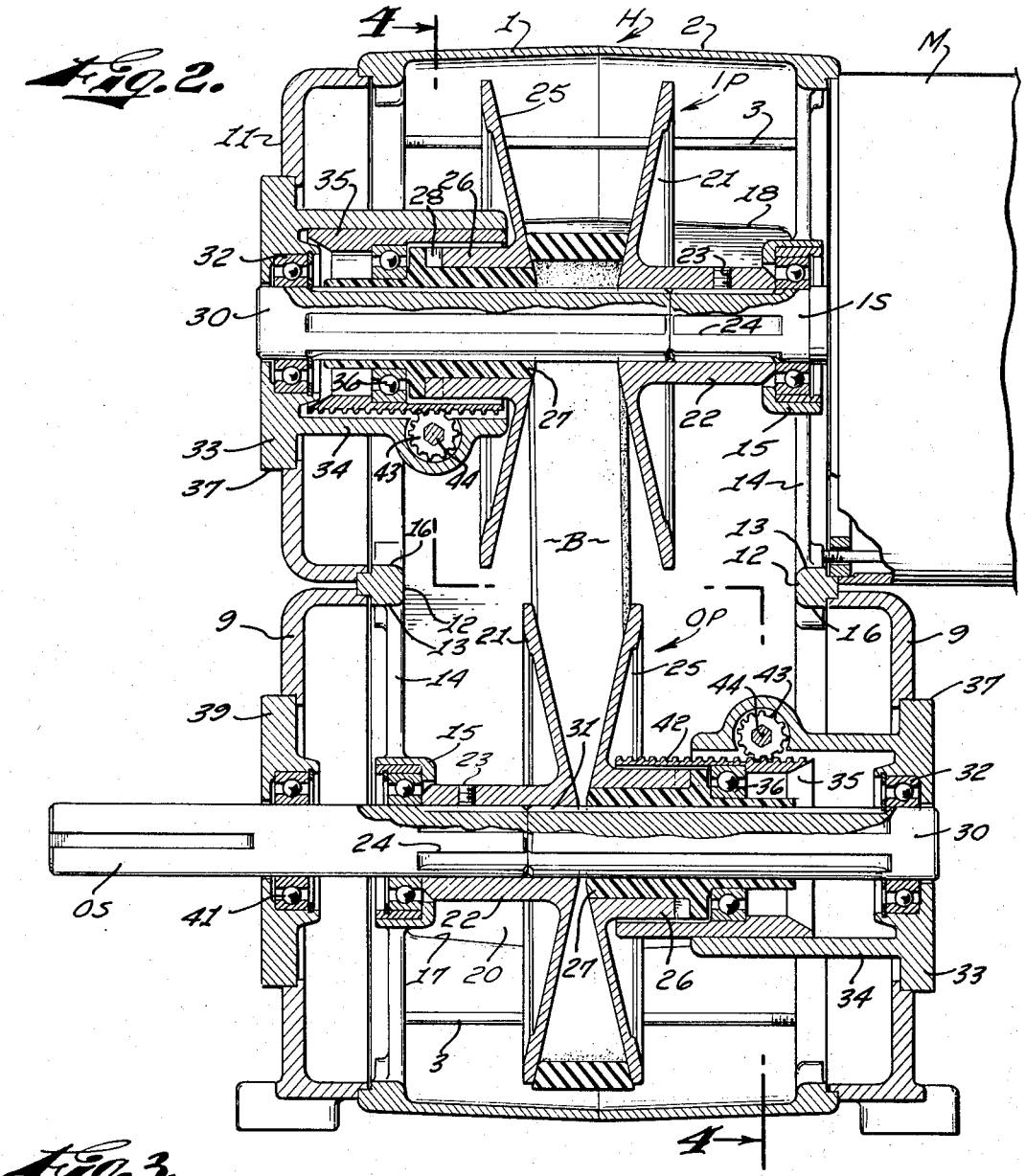
FIG. 2 is a view in vertical section with certain of the parts shown in elevation through the assembly of FIG. 1 as taken substantially on the line 2—2 of FIG. 1.

Referring to FIG. 2, it will be noted that each of the housing parts 1 and 2 is provided with a side wall 12 having an opening 13 in which is a spider 14 including a bearing hub 15 in which a motor or input shaft IS may be journalled or a driven shaft constituting the output shaft OS may be journalled. Each side wall 12 also has an opening 16 adapted to be closed by one of the closure plates 9 or 11, the latter being provided with means, which will be hereinafter more particularly described, aligned with the input shaft IS or the output shaft OS, as the case may be, so as to support an input pulley assembly IP and an output pulley assembly OP in laterally spaced relation within the housing H with a belt B extended between the pulleys.

Each of the housing parts 1 and 2 also has lateral openings 17 and 18 which, when the body halves are turned 180° and assembled in abutting relation with one another on the median plane of the housing (see FIG. 5), form an access opening at the respective opposite sides of the housing. On what might be termed the face of the device, the access opening is adapted to be closed by a closure plate 19, while at the reverse side of the device, a ventilated closure 20 may be provided.

Figure 3:
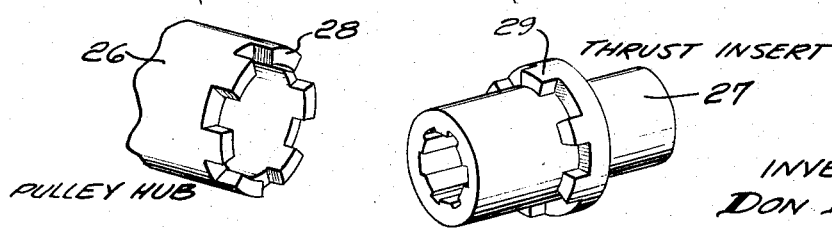
FIG. 3 is an exploded detailed view in perspective of the pulley hub and thrust insert elements of the respective pulley assemblies.

Referring now to FIG. 2, it will be noted that the input output and pulley assemblies are substantially identical. In more particularity, the input pulley assembly comprises a fixed pulley section 21 having a hub 22 suitably mounted on and affixed to the input shaft IS as by means of a set screw 23 and splines 24. Opposing the fixed pulley section 21 is an axially adjustable pulley section 25 having a hub 26 which, for illustrative purposes, is shown as mounted upon an actuator or adjustor sleeve 27, the hub 26 and sleeve 27 respectively having jaws 28 and 29 co-engaged so as to cause rotation thereof as a unit. The details of the pulley hub 26 and sleeve 27 are best shown in FIG. 3. The adjustor sleeve 27 is slidably splined as by internal splines 27′ to the input pulley shaft 30 which also extends axially into splined engagement as at 31 with the fixed pulley section 21, whereby the pulley sections are interconnected for rotation as a unit. The outer end of pulley shaft 30 is supported in a bore 32 in the end walls of a cup-like support 33 having a skirt 34 extending axially of the shaft 30 and slidably supporting therein an adjustor collar 35. The rotatable sleeve 27 is journalled within the collar 35 in a bearing 36.

Briefly reverting to FIG. 1, it will be noted that the cup-like member 33 has a flange section 37 which abuts with the closure 11 and is secured thereto by suitable fastenings 40. Consequently, the entire just-described pulley supporting mechanism including the cup-like member 33, the collar 35, bearings 32 and 36, splined sleeve 27, and pulley shaft 30 are applicable to and removable from the housing as a unitized subassembly. It will be appreciated that by virtue of such a construction, the housing parts 1 and 2 as well as the closures 11 may be composed of a lightweight material such as die cast aluminum, while the cup-like member 33 may be composed of a more durable material of heavier weight which is capable of withstanding the bearing loads during operation of the device.

As previously mentioned, the output pulley assembly is essentially identical to the input pulley assembly and, therefore, need not be described in further detail (and therefore, the same reference numerals have been applied where applicable) except to note that the bearing hub 15 supports the output shaft OS instead of the input or motor shaft IS. Therefore, to further support the output shaft OS, a bearing support 39 secured to the closure 9 by fastenings 40 is provided, this support having a bearing 41 encircling the output shaft in axially spaced relation to the bearing hub 15. It will also now be apparent that the general construction described above enables the selective interchange between input and output shafts as well as various angular relationships between closures 9 and housing parts 1 and 2 so that the housing H may assume any desired relationship to the legs 8 and the motor may be at either side of the device.

Moreover, the bearing support 39 is provided with an external diameter and configuration such as to enable the application thereto of certain standard work device fittings. Typical of such a work device fitting would be a standardized fitting as will be understood by those skilled in the art, and to provide for the securement of such a fitting to the housing H, the respective closures 9 and 11 are provided with four fastener-receiving openings 9' and 11' respectively. Referring to FIG. 1a, the pump P referred to above is shown as having such a fitting designated F secured in position by fasteners F' which extend into the fastener-receiving openings 9'.

Means are provided for effecting axial movement of the adjustor sleeves 35 of the respective pulley assemblies, as is customary in devices of the type here involved, whereby the belt B will engage the opposing divergent pulley sections at different effective pulley diameters. Such means in the illustrative embodiment includes a rack 42 extending longitudinally of each of the adjustor sleeves 35, and rotatably supported in each of the cup-like members 33 is a pinion 43 engaged with the respective rack 42 and mounted on a pinion drive shaft 44. As best seen in FIGS. 2 and 4, the skirt 34 of each cup-like member 33 has a bearing support 43a in which the ends of the pinions 43 are supported. The pinion drive shafts 44 are preferably in the form of hexagonal or other polygonal shafts which extend through the pinions 43 toward the front closure plate 19, the respective housing sections 1 and 2 being provided with bearing supports 45 for the shafts 44. The adjustor shafts 44 of the pulley assemblies are suitably retained against axial movement by means such as a pair of stop collars 43b and 45b which respectively engage the bearing supports 43a and 45. On the shafts 44 within the closure plate 19 are an input pulley adjustor pinion 50 and an output pulley adjustor pinion 60. A rack bar 70 extends diagonally between the bearing supports 45 so as to engage at its opposite ends the respective adjustor pinions 50 and 60 within slots 46 formed in the supports 45 to allow reciprocation of the rack bar 70 within predetermined limits. The limit of such reciprocation is controllable by adjustable abutments or stop screws 47, the inner ends of which extend into the slots 46.

As seen in FIGS. 1 and 4, the adjustor shaft 44 of the input pulley assembly extends through the closure plate 19 and supports the adjustor handle 5. The latter is preferably provided with spring-loaded ball detent means 48 engageable with ribs 49 on the face of the closure plate 19 and arranged in the angularly spaced relation, so as to retain the adjustor handle 5 in any desired position as indicated by the index markings 5' referred to above. It will now be understood that the angular positioning of the handle 5 determines the relative axial spacing between the respective adjustor pulley sections 25 and fixed pulley sections 21 of both the input and the output pulley assemblies and, hence, the drive ratio between the input and output assemblies. This is apparent inasmuch as the input pulley adjustor shaft 44 upon being angularly adjusted by the handle 5 will not only cause longitudinal movement of the input pulley adjustor collar 35 through engagement of pinion 43 with rack 42 of the input pulley assembly, but will also cause corresponding opposite adjustment of the adjustable output pulley section through the intermediary of the adjustor rack 70 and the adjustor pinions 50 and 60, inasmuch as the respective adjustor pinions 50 and 60 engage the rack bar at opposite longitudinal sides thereof. The effective relationship between the rack and the adjustor pinions is also adjustable by means of a turnbuckle connection 71 between the opposite ends of the rack, whereby preliminary friction pressure between the pulley sections and the belt may be established as desired.

Inasmuch as the requirement for friction pressure between the pulley sections and the belt B at different speed ratios varies considerably depending upon the application or use to which the device is to be put, the present invention provides, to accomplish certain of its objectives, means for imposing on the motion or travel imparted to either or both of the adjustable pulley sections by the rack 70 a variable motion or travel, and more specifically the variable motion or travel may be predetermined to satisfy the various use requirements for the device. In this connection, it is a fact that the linear path of travel of the belt about the pulleys becomes progressively longer as the input to output ratio of the pulleys is varied in either direction from the mean 1:1 ratio. Therefore, within the purview of the invention, one variable motion or travel which may be desirably imposed on at least one of the pulleys during adjustment of the same in either direction from a mean position is a motion or travel which will compensate for the difference in belt path length so as to eliminate the axial belt deformation which would otherwise occur, with the result that belt life is significantly enhanced. In certain applications of the device, moreover, it is characteristic that at high output speeds the belt friction pressure should be relatively light to attain maximum belt life. Therefore, the invention also contemplates within its purview imposing on one of the adjustable pulleys a motion supplemental to normal adjusting motion so that the higher the output speed, the lower will be the friction pressure applied to the belt between the pulley sections. In another sense, the invention contemplates supplementing the normal adjustor motions transmitted to the pulley mechanisms by the rack 70 or otherwise varying the effect of rack adjustment as may be desired and predetermined, depending upon the use of the device. To this end, the invention is such that as distinguished from an adjustment which would produce minimum friction pressure at highest output speed, the opposite result may be obtained, namely, the greater the output speed, the greater the friction pressure and, hence, the machine is adjustable so as to be well suited to applications in which the reaction torque is greatest at maximum speeds as would be the case in the use of the machine to drive certain types of pumps. While such a condition is not advantageous from the standpoint of belt life, they may nevertheless be desirable at the sacrifice of belt life. The significant point with respect to the present invention is that a structure is provided which will not only enable speed changes and pulley adjustments which take into consideration the most desirable belt to pulley friction pressure relationships, but which also will enable selective adjustment of the mechanisms whereby the speed change is effective so that the desirable operating characteristics may be obtained wholly independent of belt life considerations. In the latter connection, as has been pointed out above and as will be more fully pointed out hereinafter, one illustrative assembly and construction of the device is such as to facilitate belt change.

Referring to FIG. 5 and to the related detailed sectional views, it will be noted that for illustrative purposes the output pulley adjustor pinion 60 is mounted on its adjustor shaft 44 in eccentric relation to the latter. The eccentric relationship illustrated is one in which the rack 70 is shown in a position at which the pulleys are adjusted for low speed output, the rack 70 being in end abutment with the low speed stop 47, and the center of the adjustor shaft 44 lies on a plane which extends normal to the rack and intersects the axis of the pinion 60. It will thus be recognized that the pinion 60 is adapted to make a single revolution between slow and fast speed adjustments and that at the median speed at which the input to output ratio is 1:1, the adjustor shaft 44 supporting adjustor pinion 60 will again assume a position on the above mentioned plane lying between the true center of the adjustor pinion and the rack. Therefore, at all positions between the positions shown in FIG. 4 and a position one-half turn removed therefrom, the effective pitch diameter of the adjustor pinion 60 progressively varies.

The result of such a structure, as pointed out above, is that the ultimate motion or travel imparted to the adjustable output section 25 is a combined function of travel of the rack 70 and variation in the pitch diameter of the adjustor pinion 60, so that when the device is adjusted to a mean drive ratio, the variable adjustor pinion 60 will effect a progressively varying movement or travel of the output pulley section 25 as the adjustment progresses from the means toward and away from either a low or a high speed adjustment. Obviously, other conditions might be satisfied by simply indexing the adjustor pinion 60 angularly at any selected disposition about the polygonal adjustor shaft 44 upon assembly of the adjustor pinion thereon. Alternatively, another variable adjustment of the friction pressure on the belt may be accomplished by eccentrically mounting the adjustor pinion 50 of the input pulley assembly on its adjustor shaft 44.

By way of example of the foregoing, reference is made to FIGS. 8, 10, and 11. Assuming for the purpose of discussion that the input adjustor pinion 50 is concentrically mounted on its supporting shaft 44 (though it is shown eccentrically mounted) and that the rack 70 in relation to the adjustor pinions 50 and 60 is in a position of mean adjustment, the adjustor pinion 60 is illustrated as being eccentrically mounted upon its supporting shaft 44 in such a manner that there will be a uniform variation in the adjustment of the travel of the adjustable output pulley section, inasmuch as the center of adjustor shaft 44 is located on a plane radial to the adjustor pinion 60 and located between the true center of the latter and the rack, as clearly seen in relation to the crossed center lines indicating the true center of the gear 60. Under such circumstances, the belt B will be in the condition shown in FIG. 10 relative to the input pulley IP and the output pulley OP, the input to output ratio being obviously 1:1.

In FIG. 11 the belt to pulley relationship is such that the device is adjusted for high speed drive. In the course of effecting this adjustment, the adjustor pinion 60 will have imposed on the adjustable output pulley section 25 a total differential movement such that belt friction pressure would remain the same at all intermediate stages of adjustment of the pulley assemblies. Similarly, the same differential adjustment would be effected were the pulley assemblies adjusted to effect a low speed drive. Obviously, if desired, simply by diametrically reversing the starting relationship of adjustor pinion 60 to its supporting shaft 44, the differential travel of output pulley section 25 would be reversed, if this be the desired end result. Indeed, any intermediate result may be accomplished theoretically involving situations in which the adjustment would range between conditions of maximum friction pressure applied to the belt at maximum speed to minimum friction pressure applied to the belt at maximum speed.

In many applications, the desirable friction pressure relationship between the pulley sections and the belt would be such that it is progressively reduced as the speed increases, thereby enhancing the belt life. This may be easily accomplished by the present invention and, in the illustrative embodiment now being described, this is accomplished in combination with the just-described variable adjustment of one of the pulley assemblies to compensate for differences in length of belt path. For example, referring to FIG. 8, the adjustor shaft 44 on which the adjustor pinion 50 is mounted is specifically illustrated as being eccentric in the direction of movement of the rack 70, that is, the center of the shaft 44 lies on a plane radial to the true center of the pinion 50 and parallel to the rack 70, as clearly seen in relation to the crossed center lines which show the true center of the gear 50. The condition illustrated in FIG. 8 is that of a mean adjustment, and it will therefore be recognized that in increasing the output speed the adjustor pinion 50 will be rotated in a clockwise direction, thereby progressively increasing the effective pitch diameter of the pinion 50 to cause the addititon of the eccentric correction to the normal travel of the input pulley section 25 away from the stationary input pulley section. Here again, if the starting relationship of the center of the shaft 44 to the center of the pinion 50 is 180° removed from that shown in FIG. 8, the reverse condition will be obtained at maximum output speed, namely, the friction pressure on the belt will be the greatest.

Inasmuch as the eccentric pinions 50 and 60 may be variously adjusted on the supporting shafts 44, it is apparent that the rack 70 must be supported in such a manner that it may be progressively displaced in a direction away from and be capable of moving toward the adjustor shafts 44. Therefore, as best seen in FIGS. 5 and 7, there are disclosed a pair of resilient means 72 each including a hollow cap 73 threaded into the support 45 at one side of the rack 70 and having therein a spring 74 which biases outwardly an anti-friction pad 75, whereby each end of the rack 70 is continuously biased toward the adjacent adjustor shaft 44 and into engagement with its adjustor pinion 50 or 60.

In addition to the foregoing, it may be desirable that means be provided to maintain a biasing force on the adjustable pulley sections 25 of both of the pulley assemblies so that upon the occurrence of belt wear, such wear will be compensated for by progressive movement of the adjustable pulley sections toward the fixed pulley sections. In the illustrative embodiment, such means is shown as including a torsion spring 76 having an end 77 interengaged with one of the sections of rack 70, the spring being coiled about the nut 78 of the turnbuckle 71 referred to above and having its other end 79 interengaged with the nut 78. In such a construction the spring is wound and stressed so that it will maintain a constant torque on the nut 78 tending to spread the sections of the rack 70 apart, thereby applying the force to the adjustable pulley section necessary to compensate for belt wear.

As referred to above, it is desirable that the belt B be easily accessible for purposes of change or following breakage of the belt, and installation of a new belt should be a simple operation. This is particularly significant when, as in the case of the present invention, it is possible to so adjust the friction pressure applied to the belt that at any desired load condition the belt may be subjected to high friction pressures to prevent slippage under high torque loads, and more particularly when the friction pressure is high at high speeds. Referring to FIG. 12 wherein the housing H is shown with the rear closure plate 20 removed, it will be noted that the illustrative embodiment of the invention substantially facilitates the replacement or installation of belts. As previously described, the pulley shafts 30 have splined engagement with the hub 22 of the respective fixed pulley sections 21. In addition, the adjustable pulley section 25 of each pulley assembly and its supporting structure including the sleeve 27, bearing 36, adjustor collar 35, and supporting cup 33 are an assemblage which with the pulley shaft 30 is adapted to be moved as a unit laterally outward of the housing H, as clearly seen in FIG. 12, following removal of adjustor shafts 44 from the pinions 43 whereby to enable movement of the respective pinions 43 along with the adjustor collars 35. Under such conditions the inner extremity of the pulley shaft 30 of each pulley assembly is retracted by the hub 22 of the fixed pulley section 21 to provide a gap G through which the belt B may be passed. This belt changing operation may be accomplished by simply loosening stop collar 45b on input pulley adjustor shaft 44 to allow removal of the latter from its pinion 43, removal of the input adjustor shaft 44 from its pinion 43, and removal of the retaining fasteners 38 which secure the flanges 37 of the adjustable pulley supporting cups 33 on the closure plates 11 and 9 of the illustrative structure. Following removal of the old belt and the passage of a new belt through the gap G, each adjustable pulley section assembly is then moved inwardly to effect re-engagement of the pulley shaft 30 with the fixed pulley hub 22 of each pulley assembly, the cups 33 again secured in position, and the adjustor shafts 44 relocated and secured. Such belt change may be accomplished without disturbing the selected adjustment of the relationship between the adjustor pinions 50 and 60 and the rack 70. However, in the event that the turnbuckle adjustor 71 has been availed of to compensate for wear of the old belt, the initial friction pressure applicable to the new belt may be preliminarily set by removing the front closure 19 to enable access to the rack 70 as shown in FIG. 4.

Referring to FIG. 13, there is illustrated a variable pulley belt drive assembly which in general is the same as that heretofore described, but which has been modified to incorporate adjustor means in accordance with another embodiment of the invention, as well as to incorporate modified input and output shaft assemblies combined with modified attachment flange elements. In the embodiment of FIG. 13 the same reference numerals are employed as those employed in connection with FIGS. 1 through 12 where the parts correspond.

As regards the input and output shaft assemblies of the embodiment of FIG. 13, reference is made to FIGS. 14 and 15, the input or motor shaft IS connection being shown in FIG. 14 and the output shaft OS being shown in FIG. 15. The input shaft IS is FIG. 14 is shown as being a hollow shaft internally splined to receive a correspondingly splined end of a stub shaft 101 having a splined end 102 which drivingly engages with the pulley hub 22 of the axially fixed pulley section 21. Means are provided for holding the stub shaft 101 in position in the hollow input shaft IS, and such means illustratively may include an abutment washer or body 103 adapted to engage the inner ends of the internal input shaft splines 104 and to carry a bolt 105 adapted to threadedly engage in the end of the stub shaft 101 so as to draw the stub shaft into the hollow input shaft so that the splined end 102 of the stub shaft abuts with the end of the hollow input shaft IS. The washer 103 is provided about its outer periphery at 103a with an O-ring or other means for resiliently frictionally engaging within the hollow stub shaft. In addition, in this assemblage the input pulley shaft designated 130 is provided with a through bore 130a and internal splines 134 adapted to receive a splined shaft end of a work device (not shown), for example, such as that hereinafter to be described in connection with the output pulley shaft assembly. The bore 130a of pulley shaft 130 is also adapted to contain a washer such as that designated 103, and in the event that such washer (shown in broken lines) is not in use for securing a stub shaft in the splines 134 (for example, if the work device be provided with a shaft which fits splines 134) the resilient friction means 103a serves to maintain a tight rattle-free positioning of the washer in the bore 130a of the input pulley shaft. It will now be understood that by virtue of the use of a stub shaft 101, the assembly is adapted to accommodate either a motor M of the type shown in FIG. 2 having a standard motor shaft or, as in FIG. 14, the motor shaft may be hollow.

Referring to FIG. 15, the output shaft OS is shown as being a hollow shaft journalled in the bearing 41 and in the bearing means 15 as in the previously described embodiment, but the connection of the output shaft of FIG. 15 to a work device is accomplished by a stub shaft 106 having a splined end 107 adapted to fit within the internally splined hollow output shaft. The stub shaft 106, like the stub shaft 101, is adapted to be drawn into operative position in the hollow output shaft by means of an abutment washer or body 108 having a bolt 109 which engages in the splined end 107 of the stub shaft 106 and also having friction means in the form of an O-ring 108a. The other end of the stub shaft 106 may be of suitable form and size so as to fit any selected work device, and in the illustrative embodiment the stub shaft 106 is shown as having a cylindrical outer end 110 provided with an elongate keyway 111 adapted to receive a key 112 for connecting the latter to a hollow input shaft 113 of a work device generally denoted at 114. The output pulley shaft designated 130 in FIG. 15 like the input pulley shaft 130 of FIG. 14 is hollow throughout its length and is provided at its outer end with internal splines 134 so that, if desired, a work device (not shown) may be connected to the output pulley shaft, resulting in a so-called C drive connection between motor M and such work device. In this connection, it is notable that the abutment body 108, as shown in broken lines in FIG. 15, may be placed in the output pulley shaft bore 130 for use when desired, either as an abutment engageable with the output pulley shaft splines 134 or an abutment engageable with the similar splines in the output shaft OS as actually shown in full lines in FIG. 15. It is apparent that since both shafts 130 and OS are hollow, the abutment body may be alternatively shifted into either shaft, and if not used, as for example in the event that the work device has its own external input shaft, the abutment member 108 will be frictionally held in the hollow shaft 130 or in shaft OS by the ring 108a.

In addition, as best seen in FIG. 15, the support designated 139 for the bearing 41 has an annular flange 140 provided with an outer annular wall 141 corresponding to the outer periphery of the member 39 described in connection with FIGS. 1 and 1a. The flange 140 is also provided with an inner annular wall 142 whereby the bearing support 139 is adapted to receive different types of standard fittings.

It will be noted in the latter connection that the bearing support 139 and correspondingly cup-like member 133 similar to those designated 33 in the first described embodiment are secured to the housing closures 9 and 11 by means of the fasteners 40 corresponding to those described in connection with FIG. 1. However, the bearing support 139 and the cup-like members 133 are provided with a square base section so as to provide right angularly related corners 143 provided with threaded openings 144 adapted to receive fasteners (not shown) for retaining an attachment member of a work device which may be centered on the annular inner wall 142 of the flange 140, as is well known to those skilled in the art. Such an attachment device may typically be a standard hydraulic fitting.

Alternatively, as specifically illustrated in FIG. 15, the flange 140 is adapted to accommodate another standardized fitting which is centered upon the outer annular wall 141 of the flange 140 and which typically is provided with outwardly projecting ears 146 which will accommodate fasteners 147 adapted to engage in the threaded openings 9' of housing closure 9 (or alternatively of a housing closure 11 as the case may be). Such a fitting is designated at F in FIG. 1a and correspondingly at F in FIG. 15 from which it is clear that the bearing support 39 or the bearing support 139 are equally well adapted to receive such a standard fitting carried by the pump P of FIG. 1a or by the work device 114 of FIG. 15.

Passing now to FIG. 17, it will be noted that the input and output pulley assemblies IP and OP are relatively adjusted as in the case of FIG. 2 to a condition of low speed drive of the belt B from the input pulley to the output pulley, and as in the case of the first described embodiment, the drive ratio is varied by relatively axially adjusting the shiftable pulley sections 25 with respect to the axially fixed pulley sections 21 of the respective pulley assemblies. Such adjustment is effected through the adjustor pinions 43 adapted to be driven by the adjustor shafts 44 and drivingly engaging the racks 42 formed on the collars 35, all diagrammatically illustrated in FIG. 17.

In the embodiment now being described, the rack engaging pinions 43 and more particularly the respective adjustor shafts 44 are directly drivingly engaged by an input pulley adjustor mechanism generally denoted at 200 and an output pulley assembly adjustor mechanism generally denoted at 201. Each of the mechanisms 200 and 201 typically includes a gear reducer mechanism 202 driven by an electric motor 203, the gear mechanisms 202 respectively urging the shafts 44 constantly in the same direction to move pulley sections 25 in opposite directions when the motors 203 are energized, i.e., urging the adjustable input pulley section 25 toward its associated fixed pulley section 21 and likewise urging the output pulley section 25 toward its associated axially fixed pulley section 21.

Electrical control means for the motors 203 are provided whereby selectively one of the motors is provided with higher voltage than the other so as to overcome said other motor whereby to effect relative adjustment of the pulley assemblies, and maintenance of selected pulley adjustment is accomplished by the control circuit supplying both motors with the same voltage, the pulley adjustor mechanisms thereby effectively being locked at a selected adjusted position. In addition, the friction pressure applied to the belt B is controlled by varying the net voltage applied to both motors holding the adjustor mechanisms locked in so that by varying the equal voltages applied to both motors when in the locked in condition, a selected friction pressure may be maintained on the belt B within limits necessitated by the practical application of the variable pulley belt drive. This is to say that in the case that high friction pressure is desired at low speed, the motors will be supplied with higher equal voltages than would be the case where the highest friction pressure is desired at highest output speed.

Referring to the motor controlling circuitry of FIG. 17, power is supplied to both motors through an input lead 205. The input voltage passes through a variable belt tension control potentiometer including resistor 206 which will hereinafter be described in greater detail, to a conductor 207. In the conductor 207 is a variable resistor 207a the purpose of which will more fully appear hereinafter. Conductor 207 leads to a conductor 208 to a conductor 209 and to a conductor 210. Conductor 208 has a first or high speed limit switch 211 and a second or low speed limit switch 212 therein, such limit switches being shown in a closed condition so that through the conductor 208 and through the limit switches, voltage is supplied to a sweep arm 213 of a control potentiometer generally denoted at 214. The sweep arm 213 is in contact with a split variable resistor generally denoted at 215 and having a first section 216 connected by a lead 217 to input pulley adjustor motor 203 and a second resistor section 218 connected by a conductor 219 to output pulley adjustor motor 203. Interposed in the input pulley adjustor motor lead 217 is a variable resistor 217a and correspondingly a variable resistor 219a is interposed in the output pulley adjustor motor lead 219. The variable resistors 217a and 219a are to be employed for the purpose of establishing a balanced force relationship between the axially adjustable pulley sections 25 and their respective fixed pulley sections 21. This is to say that in the event that the respective pulley adjustor motors 203 have differential operating characteristics caused by variations in the winding of the motor coils or other factors, such difference may be adjusted out by relative adjustment of the resistors 217a and 219a. Such adjustment may also be employed to compensate for differences in the friction drag characteristics which must be overcome by the respective motors 203 in order to shift the pulley sections 25.

Assuming that the sweep arm 213 is in the position shown in broken lines in FIG. 17, and also assuming that variable resistors 217a and 219a are set at the same value, it will be observed that the voltage supplied to each of the motors 203 will be equal in view of the fact that the resistor sections 216 and 218 will be of equal value. Under such circumstances, whatever may be the voltage supplied through sweep arm 213 by the split resistor 215, the motors 203 will be locked in in the sense that they will be exerting equal opposite forces on the respective pulley sections 25 tending to move the same toward their fixed pulley sections 21. The magnitude of the voltage supplied to the motors under these circumstances will, of course, determine the actual friction pressure applied to the belt B by the pulley sections.

The magnitude of the motor lock in voltage is determined by the above mentioned variable resistor 206 which, as illustrated, may be actuated by a cam follower 206a which is engaged by a variable cam surface 206b of a cam 206c which is mounted on the output pulley adjustor shaft 44 for rotation therewith. Accordingly, the relative angular disposition of the cam 206c and the follower 206a will determine the input voltage passing through variable resistor 206 to the input lead 207. Likewise, the angular disposition of the cam 206c is a function of the state of adjustment of the output pulley section 25. By suitably varying the contour of the cam surface 206b it will now be understood that at different stages of adjustment of the output pulley section 26 a different holding voltage can be supplied to both motors 203. It will also now be apparent that by virtue of the variable resistor 207a in the conductor 207, the magnitude of the voltage throughout the range of adjustment effected by the belt tension control potentiometer 206 may be established as desired so that a selected belt friction pressure may be obtained depending upon the work conditions to be encountered.

Assuming now that it is desired that the pulley assemblies be relatively adjusted to increase the output speed, this may be accomplished by the moving of the sweep contact 213 to any desired location along the extent of resistor section 216. Such adjustment of the sweep contact 213 may be accomplished, for example, by a manually revolvable controller 214a suitably marked to indicate the direction of turning of the control knob for effecting the desired change in the pulley mechanisms. The location of contact of sweep contact 213 with resistor section 216 will determine the differential voltage applied to the respective motors 203. With the sweep contact 213 as shown in full lines in FIG. 17 located substantially at the end of its range of movement along resistor section 216 away from the midpoint of the split resistor, the voltage supplied to the input pulley adjustor motor 203 will be greater than the voltage supplied to the output pulley adjustor motor 203, since substantially all the resistance of the split resistor 215 is in the output pulley adjustor lead 219. This voltage differential, of course, does not determine the ultimate change in pulley drive ratio, but merely determines the force applied to effect such adjustments.

Under some circumstances, as is well known in the art, speed change may be effected rapidly, but in other circumstances, particularly under high load, the speed change must be effected slowly. Therefore, the position of the selector 214a and the sweep contact 213, as noted above, determine the force applied to make the adjustment and the rate at which the adjustment may be accomplished. As is also well known in the art, the operator of the device may visually observe when the desired change in input to output ratio has been accomplished, or indeed, as is known in the art, suitable tachometer means may be availed of so as to visually indicate the actual output speed. In any event, when the desired change of speed has been accomplished, the operator simply moves the manual sweep contact 213 back to the midpoint, as shown in broken lines in FIG. 17, so that the adjustor motors are again locked in.

It will be noted, however, that during the course of the change in drive ratio between the pulley assemblies, the cam 206c will have been revolved a certain extent relative to the cam follower 206a so that as a function of the contour of cam surface 206b the voltage applied to both motors will now be at a different value than prior to the adjustment and, therefore, the friction pressure applied to the belt by the continued but balanced energization of the motors will be at a selected and desired level, dependent upon the contour of cam surface 206b and upon the setting of variable resistor 107a.

In order to avoid damage to the system and limit the extent of pulley adjustment and thereby impose a high and low ratio limit on such adjustment, the cam 206c is adapted to actuate the aforementioned limit switches 211 and 212. Accordingly, cam 206c is provided with high speed limit switch operating means in the form of a lug 211a and low speed limit switch operating means in the form of a lug 212a respectively adapted to engage high speed limit switch actuator 211b and low speed limit switch actuator 212b when the cam 206c is moved angularly beyond a predetermined limit.

Again assuming that it is desired that the ratio be changed from the low speed drive represented in FIG. 17 to a condition of high speed drive and that the sweep contact 213 has been moved from the broken line midpoint position to the full line position for increasing the output speed, the cam 206 will be revolved in a counterclockwise direction until the lug 211a engages the high speed limit switch actuator 211b and causes high speed limit switch 211 to be opened, thus opening the circuit through conductor 208 to the sweep contact 213. Simultaneously, this will result in the closure of a switch 211c whereby power will be supplied through switch 211c from conductor 209 to a lead 209a through a normally closed switch 209b in line 209a and will energize a relay coil 209c resulting in the closure of the normally open switch 209d, whereby power is supplied to the split resistor 215 at its midpoint, thus locking in the adjustor motors 203 at the limit of the high speed adjustment. Further adjustment is prevented by the fact that the limit switch 211 has been opened.

If it is desired that the apparatus operate at the limit of high speed adjustment, then the circuit may be left in the just described limiting condition with the motors locked in, but if it is desired that the output speed be reduced as, for example, in the case that the adjustment has reached its limit through inadvertence of the operator, then means are provided for at least momentarily effecting differential energization of the motors 203 so as to cause movement of the cam 206c in the opposite direction so that limit switch 211 may reclose. In this connection, the sweep contact 213 carries a conductor bar 213a which is adapted to bridge the gap between three contacts respectively designated 220, 221, and 222. Middle contact 221 is connected by a conductor 221a to a relay coil 221b which, when energized, will open the normally closed switch 209b through which, under the conditions now being described, power is being supplied to the motors to hold them in the locked in condition. Contact 222 is in a conductor 222a leading to a contact 222b which, through a switch 222c, has been connected to the conductor 210 described above and which is constantly connected to the input source. Therefore, contact 222 is an energized contact when switch 222c is closed, so that when the sweep contact 213 is moved past the midpoint and bridges contacts 221 and 222 with the bar 213a, the relay 221b will be energized to open normally closed switch 209b and power will be supplied through line 222a, bar contact 213a, and sweep contact 213 to split resistor section 218 to supply power to the output pulley adjustor motor 203 at a greater voltage than to the input pulley adjustor motor 203 until the cam 205c moves a sufficient distance to allow limit switch 211 to reclose, thereby opening switch 222c. When switch 222c opens, it will now be understood that the power source to relay 221b will be interrupted and normally closed switch 209b will close. Likewise, switch 211c will open, interrupting the flow of current to the relay 209c so that normally open switch 209d will again open. At this time the operator need merely observe the continuing adjustment of the mechanism until it has reached the desired lower speed output and then he may return the sweep contact 213 to the midpoint so that the adjustor motors will be locked in at a point within the limits.

From the foregoing, it will now be apparent that in the event that low speed switch actuator 212b is operated by lug 212a on the cam 206c, low speed limit switch 212 will be opened, causing closure of switch 212c, thereby energizing line 209a as previously described, since the circuit to line 209a is closed through switch 211, a branch line 209e, and switch 212c. Likewise, switch 220c, is caused to close so as to engage contact 220b in conductor 220a which leads to contact 220, the latter being adapted to establish the circuit through line 221a to the relay 221b when the contacts 220 and 221 are bridged by the bar conductor 213a. Under such circumstances, a differential voltage will be supplied to the motors 203 so as to cause movement of the cam 206c in the opposite direction, resulting in the reclosure of limit switch 212 and the opening of switches 212c and 220c.

While for illustrative purposes the motor controlling circuitry is illustrated as being controlled by a manually operated selector knob 214a, it will be appreciated that within the purview of the invention the motors may be otherwise controlled. For example, suitable monitoring means (not shown) may be employed so that the sweep arm may be operated as desired in accordance with predetermined programming of the operation of the variable speed pulley belt drive.

While the specific details of various features of the invention have been herein shown and described, changes and alterations may be made without departing from the spirit of the invention as defined in the appended claims.

I claim:

1. In a variable pulley belt drive, comprising: a support structure; an input shaft and an output shaft carried by said support structure in laterally spaced relation; input and output pulley assemblies operatively connected with said respective shafts and each including a pair of pulley sections having divergent surfaces; means mounting said pulley sections for movement of one pulley section of each assembly toward and away from the other pulley section; means for moving said one pulley of both of said assemblies including a pair of adjustor shafts; means connecting said adjustor shafts respectively to one of said movable pulleys to move the latter upon rotation of said adjustor shafts; and means for rotating said pair of adjustor shafts; the improvement wherein said means for rotating said adjustor shafts includes means for progressively varying the travel of at least one of said adjustable pulley sections.

2. A variable pulley belt drive as defined in claim 1, wherein said means for progressively varying the travel of at least one of said adjustable pulley sections includes eccentric means for correcting the travel of said latter movable pulley section to a distance equal to the distance of travel of the other pulley section plus or minus a correction factor.

3. A variable pulley belt drive as defined in claim 1, wherein said means for progressively varying the travel of at least one of said adjustable pulley sections includes a rack extended between the adjustor means of the respective pulley assemblies and an adjustor pinion on each adjustor shaft and engaged with said rack, at least one of said pinions being eccentrically mounted upon its shaft.

4. A variable pulley belt drive as defined in claim 1, wherein said means for progressively varying the travel of at least one of said adjustable pulley sections includes a rack extended between the adjustor means of the respective pulley assemblies and an adjustor pinion on each adjustor shaft and engaged with said rack, at least one of said pinions being eccentrically mounted upon its shaft on a center which lies on a plane normal to the rack and radial to the center of said eccentrically mounted pinion.

5. A variable pulley belt drive as defined in claim 1, wherein said means for progressively varying the travel of at least one of said adjustable pulley sections includes a rack extended between the adjustor means of the respective pulley assemblies and an adjustor pinion on each adjustor shaft and engaged with said rack, at least one of said adjustor shafts and its pinion having means for interconnecting the same in selective different eccentric positions.

6. A variable pulley belt drive as defined in claim 1, wherein said means for progressively varying the travel of at least one of said adjustable pulley sections includes a rack extended between the adjustor means of the respective pulley assemblies and an adjustor pinion on each adjustor shaft and engaged with said rack, at least one of said adjustor shafts being polygonal in cross section and the pinion on said polygonal shaft having a complemental polygonal opening through which said shaft extends.

7. A variable pulley belt drive as defined in claim 1, wherein said means for progressively varying the travel of at least one of said adjustable pulley sections comprises a member eccentrically mounted on one of said adjustor shafts to vary the extent of rotation of said one adjustor shaft.

8. A variable pulley belt drive as defined in claim 1, wherein said means for progressively varying the travel of at least one of said adjustable pulley sections includes a rack extended between the adjustor means of the respective pulley assemblies and an adjustor pinion on each adjustor shaft and engaged with said rack, at least one of said pinions being eccentrically mounted upon its shaft; and said rack having adjustor means for varying its length.

9. A variable pulley belt drive as defined in claim 1 wherein said means for progressively varying the travel of at least one of said adjustable pulley sections includes a rack extended between the adjustor means of the respective pulley assemblies and an adjustor pinion on each adjustor shaft and engaged with said rack, at least one of said pinions being eccentrically mounted upon its shaft; said rack having adjustor means for varying its length; and means for biasing said adjustor means to maintain a force tending to vary the length of said rack.

10. A variable pulley belt drive as defined in claim 1 wherein said means for progressively varying the travel of at least one of said adjustable pulley sections includes a rack extended between the adjustor means of the respective pulley assemblies and an adjustor pinion on each adjustor shaft and engaged with said rack, at least one of said pinions being eccentrically mounted upon its shaft, and means resiliently supporting said rack adjacent said eccentrically mounted pinion to allow movement of said rack away from and toward said adjustor shaft on which said pinion is eccentrically mounted.

11. In a variable pulley belt drive, comprising: a support structure; an input shaft and an output shaft carried by said support structure in laterally spaced relation; input and output pulley assemblies operatively connected with said respective shafts and each including a pair of pulley sections having divergent surfaces; means mounting said pulley sections for movement of one pulley section of each assembly toward and away from the other pulley section; means for moving said one pulley of both of said assemblies including a pair of adjustor shafts; means connecting said adjustor shafts respectively to one of said movable pulleys to move the latter upon rotation of said adjustor shafts; and means for effecting simultaneous differential rotation of said adjustor shafts.

12. A variable pulley belt drive as defined in claim 11, wherein said means for effecting differential rotation of said adjustor shafts comprises gear means including a gear on each adjustor shaft, the gear on one of said shafts having a varying pitch diameter.

13. A variable pulley belt drive as defined in claim 11, wherein said means for effecting differential rotation of said adjustor shafts comprises a gear on each adjustor shaft and means for driving said gears simultaneously, one of said gears being eccentrically mounted on its adjustor shaft.

14. A variable pulley belt drive as defined in claim 11, wherein said means for effecting differential rotation of said adjustor shafts comprises a gear on each adjustor shaft and means for driving said gears simultaneously, and including means adjustably mounting one of said gears in eccentric relation on its adjustor shaft.

15. In a variable pulley belt drive, comprising: a support structure; an input shaft and an output shaft carried by said support structure in laterally spaced relation; input and output pulley assemblies operatively connected with said respective shafts and each including a pair of pulley sections having divergent surfaces; means mounting said pulley sections for movement of one pulley section of each assembly toward and away from the other pulley section; means for moving said one pulley of both of said assemblies including a pair of adjustor shafts; means connecting said adjustor shafts respectively to one of said movable pulleys to move the latter upon rotation of said adjustor shafts; and means for effecting simultaneous differential rotation of said adjustor shafts; including means adjustably connected to each of said adjustor shafts for varying the extent of rotation of said adjustor shafts.

16. A variable pulley belt drive as defined in claim 15, wherein said means adjustably connected to each of said adjustor shafts comprises a rotatable member eccentrically disposed on the adjustor shaft.

17. A variable pulley belt drive as defined in claim 15, wherein said means adjustably connected to each of said adjustor shafts comprises a gear having a polygonal eccentric opening and the shaft having a complemental polygonal section disposed in said opening.

18. A variable pulley belt drive as defined in claim 15, wherein said means adjustably connected to each of said adjustor shafts comprises a gear having a polygonal eccentric opening and the shaft having a complemental polygonal section disposed in said opening, and including a rack engaged at its opposite ends with the respective gears.

19. A variable pulley belt drive as defined in claim 15, wherein said means adjustably connected to each of said adjustor shafts comprises a gear having a polygonal eccentric opening and the shaft having a complemental polygonal section disposed in said opening, and including a rack engaged at its opposite ends with the respective gears, said rack having means for varying its length.

20. A variable pulley belt drive as defined in claim 15, wherein said means adustably connected to each of said adjustor shafts comprises a gear having a polygonal eccentric opening and the shaft having a complemental polygonal section disposed in said opening, and including a rack engaged at its opposite ends with the respective gears, said rack having means for varying its length, and resilient means biasing the ends of said rack in opposite directions.

21. In a variable pulley belt drive, comprising: a support structure; an input shaft and an output shaft carried by said support structure in laterally spaced relation; input and output pulley assemblies operatively connected with said respective shafts and each including a pair of pulley sections having divergent surfaces; means mounting said pulley sections for movement of one pulley section of each assembly toward and away from the other pulley section; means for moving said one pulley of both of said assemblies including a pair of adjustor shafts; means connecting said adjustor shafts respectively to one of said movable pulleys to move the latter upon rotation of said adjustor shafts; means for effecting simultaneous differential rotation of said adjustor shafts; means separably connecting said pulley sections of each of said pulley assemblies for unitized rotation of said pulley sections including a pulley shaft having an end removably disposed in one of said pulley sections, and means supporting said pulley shaft for movement of said pulley shaft and the other of said pulley sections away from the other pulley section to form a gap between said pulley sections.

22. A variable pulley belt drive as defined in claim 21 wherein said pulley shaft is provided with a bore therethrough and with means remote from said pulley sections for connection with a power shaft for effecting rotation of said power shaft with said pulley shaft.

23. A variable pulley belt drive as defined in claim 21 wherein said pulley shaft is provided with a bore therethrough and with means remote from said pulley sections for connection with a power shaft for effecting rotation of said power shaft with said pulley shaft, and an abutment member slidably disposed in said pulley shaft and having means securing said power shaft in said pulley shaft, said abutment member having means frictionally engaged within said pulley shaft.

24. A pulley assembly comprising: a pair of pulley sections; hollow shaft means supporting said pulley sections for movement of one of said sections toward and away from the other of said sections and for rotation of said sections as a unit; said shaft means including end sections projecting axially from said pulley sections and having internal splines therein for connection to a power shaft at the opposite ends of said shaft means; and an abutment member shiftably supported within said hollow shaft means and having means for detachable connection to a power shaft.

25. A pulley assembly as defined in claim 24 wherein said abutment member is provided with means frictionally engageable within said hollow shaft means for holding the abutment member against movement within said hollow shaft means when said abutment member is free from connection to a power shaft.

26. A pulley assembly as defined in claim 24 in which said hollow shaft means comprises a pair of separable shaft members; one of said pulley sections being fixedly mounted on one of said shaft members and the other of said shaft members extending through the other of said pulley sections into said one of said pulley sections, whereby said shaft members and said pulley sections may be axially separated to permit the passage of a bolt therebetween.

27. In a variable pulley belt drive, comprising: a support structure; an input shaft and an output shaft carried by said support structure in laterally spaced relation; input and output pulley assemblies operatively connected with said respective shafts and each including a pair of pulley sections having divergent surfaces; means mounting said pulley sections for movement of one pulley section of each assembly toward and away from the other pulley section; means for moving said one pulley of both of said assemblies including a pair of adjustor shafts; means connecting said adjustor shafts respectively to one of said movable pulleys to move the latter upon rotation of said adjustor shafts; means for effecting simultaneous differential rotation of said adjustor shafts; means separably connecting said pulley sections of each of said pulley assemblies for unitized rotation of said pulley sections including a pulley shaft having an end removably disposed in one of said pulley sections, and means supporting said pulley shaft for movement of said pulley shaft and the other of said pulley sections away from the other pulley section to form a gap between said pulley sections, each of said pulley assemblies comprising a cup-like member; an adjustor member reciprocal in said cup-like member; means connecting one of said pulley sections of each of said pulley assemblies to said pulley shaft; and means for securing said cup-like member to said support structure.

28. A variable pulley belt drive, comprising: a housing having opposing sides each provided with a pair of openings aligned with the pair of openings in the other side of said housing; a motor connected to said housing at one of said openings said motor having an input shaft extending into said housing through said opening; an output shaft disposed in an opening laterally spaced from the input shaft opening; means supporting said output shaft in its opening; an input pulley section fixedly mounted on said input shaft and an output pulley section fixedly mounted on said output shaft; an axially adjustable input pulley section and an axially adjustable output pulley section in said housing in opposed axially spaced relation to the respective fixed input and output pulley sections; a unitized supporting assembly for each of said axially adjustable pulley sections; means for effecting opposite axial adjustment of said adjustable pulley sections relative to the respective fixed pulley sections; said unitized supporting assemblies each comprising a support member; means removably supporting said support member in one of said housing openings in alignment with the respective input and output shafts; and each of said unitized supporting assemblies including a pulley shaft removably engaged with the respective input and output pulley sections.

29. A variable pulley belt drive as defined in claim 28, wherein each of said unitized supporting assemblies includes an adjustor member reciprocably carried by said support member; and means connecting the respective axially adjustable pulley section to its adjustor member for reciprocation therewith relative to said pulley shaft.

30. A variable pulley belt drive as defined in claim 28, including a closure member interposed between each of said support members and said housing; said means supporting said output shaft in its opening including a closure member for the latter opening, certain of said closure members having supporting elements projecting therefrom; and means for interconnecting said closure members in selected angular locations on said housing.

31. A variable pulley belt drive comprising: a support structure; an input shaft and an output shaft carried by said support structure in laterally spaced relation; input and output pulley assemblies operatively connected with said respective shafts and each including a pair of pulley sections having divergent surfaces; means mounting said pulley sections for movement of one pulley section of each assembly toward and away from the other pulley section; means for moving said one pulley of both of said assemblies including a pair of adjustor shafts; means connecting said adjustor shafts respectively to one of said movable pulleys to move the latter upon rotation of said adjustor shafts; means for effecting simultaneous differential rotation of said adjustor shafts including a pair of electric motors respectively connected to one of said adjustor shafts; and means for varying the input voltage to said motors.

32. A variable pulley belt drive as defined in claim 31 wherein said means for varying the input voltage to said motors includes manually adjustable resistor means.

33. A variable pulley belt drive as defined in claim 31 wherein said means for varying the input voltage to said motors includes automatic adjustor means operable in response to the position of one of said adjustor shafts.

34. A variable pulley belt drive as defined in claim 31 including limit means responsive to adjustment of said shafts for balancing the input voltage to said motors and limiting adjustment of said shafts.

35. In a variable pulley belt drive comprising: a support structure; an input shaft and an output shaft carried by said support structure in laterally spaced relation; input and output pulley assemblies operatively connected with said respective shafts and each including a pair of pulley sections having divergent surfaces; means mounting said pulley sections for movement of one pulley section of each assembly toward and away from the other pulley section; means for moving said one pulley of both of said assemblies including a pair of adjustor shafts; means connecting said adjustor shafts respectively to one of said movable pulleys to move the latter upon rotation of said adjustor shafts; and means for rotating said pair of adjustor shafts; the improvement wherein said means for rotating said pair of adjustor shafts includes a pair of electric motors respectively connected to one of said adjustor shafts; means for supplying to and controlling a differential voltage to said motors whereby one of said motors overcomes the other of said motors to cause movement of said adjustor shafts in one direction or the other; and including means for progressively varying the voltage applied to said motors responsive to the position of one of said adjustor shafts.

36. A variable pulley belt drive as defined in claim 35 wherein said means for progressively varying the voltage applied to said motors responsive to the position of one of said adjustor shafts includes controller means in the circuit to said motors for varying the voltage, and an adjustor member on one of said adjustor shafts for actuating the controller means.

37. A variable pulley belt drive as defined in claim 35, wherein said means for progressively varying the voltage applied to said motors responsive to the position of one of said adjustor shafts includes controller means in the circuit to said motors for varying the voltage, and an adjustor member on one of said adjustor shafts for actuating the controller means, and including limit means actuated by said adjustor means upon movement of said adjustor means to a limit in one direction for rendering said controller means inoperative and balancing voltage applied to said motors.

38. A variable pulley belt drive as defined in claim 35, wherein said means for progressively varying the voltage applied to said motors responsive to the position of one of said adjustor shafts includes controller means in the circuit to said motors for varying the voltage, and an adjustor member on one of said adjustor shafts for actuating the controller means, and including limit means actuated by said adjustor means upon movement of said adjustor means to a limit in one direction for rendering said controller means inoperative and balancing voltage applied to said motors, and means for momentarily overcoming said limit means to apply a differential voltage to said motors to cause movement of said adjustor means in the opposite direction.

39. Adjustor means comprising: a pair of adjustor shafts and means for effecting simultaneous differential rotation of said adjustor shafts, including means for progressively varying the travel of at least one of said shafts.

40. Adjustor means comprising: a pair of adjustor shafts and means for rotating said shafts including means for progressively varying the travel of at least one of said shafts; said latter means including an eccentric member on one of said shafts and means controllable by said eccentric member responsive to rotation of said one shaft for causing said varying travel.

41. Adjustor means comprising: a pair of adjustor shafts and means for rotating said shafts including means for progressively varying the travel of at least one of said shafts; said latter means including a rack extending between said shafts; a pinion on each shaft engaged with said rack; one of said pinions being eccentrically mounted on its shaft.

42. Adjustor means comprising: a pair of adjustor shafts and means for rotating said pair of shafts including a pair of electric motors respectively connected to one of said adjustor shafts; means for supplying to and controlling a differential voltage to said motors whereby one of said motors overcomes the other of said motors to cause movement of said adjustor shafts in one direction or the other; and means for progressively varying the voltage applied to said motors responsive to the position of one of said adjustor shafts.

43. Adjustor means as defined in claim 42, wherein said means for progressively varying the voltage applied to said motors includes controller means in the circuit to said motors for varying the voltage, and an adjustor member on one of said adjustor shafts for actuating the controller means.

44. Adjustor means as defined in claim 43, including limit means for balancing the voltage applied to said motors upon predetermined movement of said adjustor member.

45. A variable pulley belt drive, comprising: a support structure; an input shaft and an output shaft carried by said support structure in laterally spaced relation; input and output pulley assemblies operatively connected with said respective shafts and each including a pair of pulley sections having divergent surfaces; means mounting said pulley section for movement of one pulley section of each assembly toward and away from the other pulley section; means for moving said one pulley of both of said assemblies including a pair of adjustor shafts; means connecting said adjustor shafts respectively to one of said movable pulleys to move the latter upon rotation of said adjustor shafts; means for effecting simultaneous differential rotation of said adjustor shafts including a pair of electric motors respectively connected to one of said adjustor shafts; source circuit means leading from a source of voltage to said motors; said circuit means including a split resistor connected to the respective motors; an adjustable contact member connected to the source of voltage and movable from a midpoint in either direction along said split resistor to effect a differential variation in the input voltage to said motors; and control means operable by one of said adjustor shafts to vary the voltage applied to said motors through said split resistors responsive to the position of said adjustor shaft.

46. A variable pulley belt drive as defined in claim 45, including second circuit means and switch means for opening said source circuit means and energizing said second circuit means when said one of said adjustor shafts moves beyond a predetermined limit in one direction; said second circuit means including means for applying source voltage to the midpoint of said split resistor; and means operable by said adjustable contact member to momentarily establish communication between said source circuit means and said split resistor to cause movement of said one adjustor shaft in the other direction upon movement of said adjustable contact member past the midpoint of said split resistor.

47. A variable pulley belt drive as defined in claim 45 wherein said control means comprises a cam rotatable with said one adjustor shaft and a variable resistor operated by said cam.

48. A variable pulley belt drive as defined in claim 47, including a second variable resistor in said source circuit manually operable to vary the voltage applied to said motors.

49. A variable pulley belt drive as defined in claim 45, including a manually adjustable resistor interposed between said split resistor and each of said motors.

References Cited

UNITED STATES PATENTS

| | | | |
|---|---|---|---|
| 2,573,937 | 11/1951 | Turnbull | 74—230.17 |
| 2,970,493 | 2/1961 | Rieser | 74—230.17 |
| 3,154,959 | 11/1964 | Palm | 74—230.17 |
| 3,250,141 | 5/1966 | Luenberger | 74—230.17 |

FRED C. MATTERN, Jr., *Primary Examiner.*

DAVID J. WILLIAMOWSKY, *Examiner.*

C. J. HUSAR, *Assistant Examiner.*